United States Patent [19]

Otsuki et al.

[11] Patent Number: 4,563,501

[45] Date of Patent: Jan. 7, 1986

[54] CATHODE-PRECIPITATING ELECTRODEPOSITION COATING COMPOSITION

[75] Inventors: Yutaka Otsuki, Yokohama; Yoshihiko Araki, Tokyo; Hiroyoshi Omika, Yokohama; Hajime Hara, Fujisawa; Kazuho Aoyama, Kawasaki, all of Japan

[73] Assignee: Nippon Oil Company, Ltd., Tokyo, Japan

[21] Appl. No.: 493,277

[22] Filed: May 10, 1983

[30] Foreign Application Priority Data

May 14, 1982 [JP] Japan ................................. 57-80077
Jun. 25, 1982 [JP] Japan ................................ 57-108453

[51] Int. Cl.$^4$ ...................... C09L 49/00; C08L 63/20
[52] U.S. Cl. .................................... 525/108; 525/65; 525/112; 525/113; 525/922; 523/408; 523/413; 523/414; 204/181.7
[58] Field of Search .................. 525/65, 108, 112, 113, 525/922; 204/181 C; 523/408, 413, 414

[56] References Cited

U.S. PATENT DOCUMENTS

| | | | |
|---|---|---|---|
| 4,172,062 | 10/1979 | Sekmakas | 525/113 |
| 4,246,089 | 1/1981 | Hazan | 525/113 |
| 4,335,031 | 6/1982 | Hazan | 525/65 |

FOREIGN PATENT DOCUMENTS

| | | | |
|---|---|---|---|
| 1911963 | 9/1970 | Fed. Rep. of Germany | 525/108 |
| 2832937 | 5/1979 | Fed. Rep. of Germany | 525/112 |
| 57-108168 | 7/1982 | Japan | 525/113 |
| 2075513 | 11/1981 | United Kingdom | 525/112 |

*Primary Examiner*—Allan M. Lieberman
*Attorney, Agent, or Firm*—Wenderoth, Lind & Ponack

[57] ABSTRACT

A cathode-precipitating electrodeposition coating composition consisting essentially of (A) 100 parts of a high-molecular-weight compound having a molecular weight of 500 to 10,000 and containing an amino group and a carbon-carbon double bond, (B) 3 to 200 parts by weight of a reaction product obtained by reacting an unsaturated carboxylic acid having 3 or 4 carbon atoms with the terminal glycidyl group of a glycidyl compound obtained by reacting a bisphenol with epichlorohydrin, and (C) 0.2 to 20 parts by weight of an oil-soluble manganese salt of a monoester of a 1,2-dicarboxylic acid or a manganese salt of sulfonated or maleinized polybutadiene having a molecular weight of 300 to 3,000.

5 Claims, No Drawings

CATHODE-PRECIPITATING ELECTRODEPOSITION COATING COMPOSITION

This invention relates to a cathode-precipitating electrodeposition coating composition having excellent low-temperature curability.

A resin having a certain kind of basic group generates a cation resin in water, and when electrodeposition is carried out using this resin, the resin precipitates on a cathode. A cathode-precipitating paint of this type can remove the essential defect of conventional anode-precipitating electrodeposition paints obtained by neutralizing a resin having an acid group to render it water-soluble; that is to say, it prevents a metallic article to be coated from being dissolved in the paint bath and solves various problems caused by this metal dissolution.

The present inventors studied such a cathode-precipitating paint, and found that a resin for cathode-precipitating electrodeposition paints which gives excellent film properties can be obtained by introducing an amino group into a synthetic polymer having a low degree of polymerization and containing a carbon-carbon double bond, for example a high-molecular-weight compound having an unsaturated group such as liquid polybutadiene, and neutralizing it with an acid. The results of this study were the subject of a patent application (see Japanese Laid-Open Patent Publication Nos. 119727/1976, 147638/1977 and 16048/1978).

A cathode-precipitating electrodeposition coating composition containing the aforesaid resin as a film-forming component is cured mainly by oxidative polymerization of the unsaturated group to give a coated film having excellent properties. In order to cure it within a practical curing time, it requires a relatively high baking temperature. The present inventors made investigations in order to lower the baking temperature, and found that by adding a metal dryer such as a water-soluble manganese salt, the coated film can be cured at a relatively low baking temperature. This discovery was the subject of a patent application (see Japanese Laid-Open Patent Publication No. 142444/1978). According to this technique, however, a large amount of the dryer is necessary, and there arise various problems, such as aggravation of electrodeposition coating characteristics such as throwing power, and the liability of the coated surface to become rough.

The present inventors also discovered, and applied for on a patent, a method in which an acrylic (methacrylic) double bond having high reactivity is introduced into the resin and thereby the coated film of the resin can be cured at a relatively low baking temperature (Japanese Laid-Open Patent Publication No. 151777/1981). When a water-soluble manganese salt is added in this case, the coated film cures at a relatively low temperature of 160° C., and thus, a cathode precipitating electrodeposition paint having excellent performance can be obtained. From the viewpoint of saving energy, however, it is desired to lower the baking temperature further.

It is an object of this invention therefore to provide a cathode-precipitating electrodeposition paint having low-temperature curability and excellent corrosion resistance by improving the curability of the aforesaid high-molecular-weight compound containing a carbon-carbon double bond and an amino group.

Various investigations conducted by the present inventors have led to the discovery that the aforesaid baking temperature can be further lowered by adding an oil-soluble manganese salt of a monoester of a certain 1,2-dicarboxylic acid or an oil-soluble manganese salt of a high-molecular-weight compound having a carbon-carbon double bond and a sulfonic acid group or a succinic acid group to a resin having a carbon-carbon double bond and an amino group.

According to this invention, there is provided a cathode-precipitating electrodeposition coating composition having excellent low-temperature curability consisting essentially of (A) 100 parts by weight of a high-molecular-weight compound containing a carbon-carbon double bond and 30 to 300 millimoles, per 100 g of said compound, of an amino group and having a molecular weight of 500 to 10,000 and an iodine value of 50 to 500, (B) 3 to 100 parts by weight of a compound of the general formula

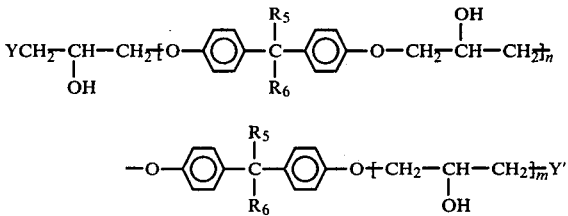

wherein $R_5$ and $R_6$ represents a hydrogen atom or an alkyl group having 1 to 10 carbon atoms, n is an integer of 0 to 20, m is 1 or 0, Y represents a residue of an $\alpha,\beta$-unsaturated monocarboxylic acid having 3 to 4 carbon atoms, and Y' represents a hydrogen atom when m is 0 and Y when m is 1, or a compound of the general formula

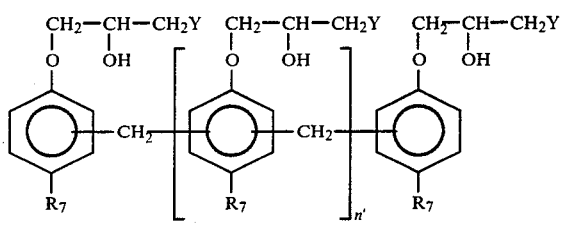

wherein n' is an integer of 0 to 10, $R_7$ represents a hydrogen atom or a hydrocarbon group having 1 to 10 carbon atoms, and Y is as defined, and (C) 0.2 to 20 parts by weight of an oil-soluble manganese salt of a monoester of a 1,2-dicarboxylic acid, represented by the general formula

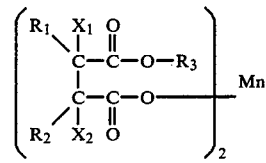

wherein $R_1$ and $R_2$ represent a hydrogen atom or an alkyl group having 1 to 20 carbon atoms, or $R_1$ and $R_2$ may be taken together to assume a six-membered ring structure or a heterocyclic structure having both a five-membered ring and a six-membered ring, which ring structure may contain an unsaturated group, $R_3$ represents an organic residue having 1 to 20 carbon atoms which may contain an ether linkage, an ester linkage and an unsaturated group, and $X_1$ and $X_2$ represent a hydrogen atom, an organic residue having 1 to 10 carbon atoms, or a bond, and when $X_1$ and $X_2$ are bonds, the carbon atoms to which $X_1$ and $X_2$ are bonded may form a double bond, or a manganese salt of a high-molecular-weight compound containing a carbon-carbon double bond and 30 to 300 millimoles, per 100 g of said compound, of a sulfonic acid group or a succinic acid group and having a molecular weight of 300 to 3,000 and an iodine value of 50 to 500.

The high-molecular-weight compound containing a carbon-carbon double bond and having a molecular weight of 500 to 10,000 and an iodine value of 50 to 500 which is a starting material for component (A) of the composition of this invention can be produced by known methods.

A typical method of producing the above starting material for component (A) comprises anionically polymerizing a conjugated diolefin having 4 to 10 carbon atoms, or anionically copolymerizing such diolefins with each other or such a diolefin with not more than 50 mole% or an aromatic vinyl monomer such as styrene, α-methylstyrene, vinyltoluene or divinylbenzene at a temperature of 0° to 100° C. in the presence of an alkali metal or an organic alkali metal compound as a catalyst. In order to control the molecular weight and obtain a polymer of a low degree of polymerization which has a low gel content and is pale-colored, it is preferred to use a chain transfer polymerization method in which an organic alkali metal compound such as benzyl sodium is used as the catalyst and a compound having an alkylaryl group such as toluene is used as a chain transfer agent (U.S. Pat. No. 3,789,090), a living polymerization method in which tetrahydrofuran is used as a solvent, a polynuclear aromatic compound such as naphthalene is used as an activator and an alkali metal such as sodium is used as the catalyst (Japanese Patent Publications Nos. 17485/1967 and 27432/1968), or a polymerization method in which an aromatic hydrocarbon such as toluene or xylene is used as a solvent, a dispersion of an alkali metal such as sodium is used as the catalyst, and the molecular weight of the polymer is controlled by adding an ether such as dioxane (Japanese Patent Publications Nos. 7446/1957, 1245/1963, and 10188/1959).

A polymer of a low degree of polymerization produced by coordination anionic polymerization in the presence of an acetylacetonate compound of a metal of Group VIII such as cobalt or nickel and an alkylaluminum halide as a catalyst can also be used (see Japanese Patent Publications Nos. 507/1970 and 80300/1971).

The component (A) of the composition of this invention, i.e. the high-molecular-weight compound containing a carbon-carbon double bond and 30 to 300 millimoles, per 100 g of the compound, of an amino group and having a molecular weight of 500 to 10,000 and an iodine value of 50 to 500 is produced by known methods.

For example, there can be used a method which comprises adding maleic anhydride to the high-molecular-weight compound having a carbon-carbon double bond, and then reacting the addition product with a diamine of the general formula

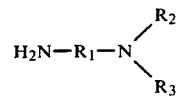

wherein $R_1$ represents a hydrocarbon group having 1 to 20 carbon atoms, and $R_2$ and $R_3$ represent a hydrogen atom or a hydrocarbon group having 1 to 20 carbon atoms which may partially be substituted by a hydroxyl group, to introduce an amino group (Japanese Laid-Open Patent Publications Nos. 119727/1976, 147638/1977, 8629/1978, and 63439/1978), or a method which comprises epoxidizing the high-molecular-weight compound having a carbon-carbon double bond and then subjecting the product to addition reaction with a primary or secondary amine (Japanese Laid-Open Patent Publications Nos. 16048/1978 and 117030/1978).

The corrosion resistance of the electrodeposition coating composition is markedly improved by adding the component (B), i.e. the compound of general formula (b)

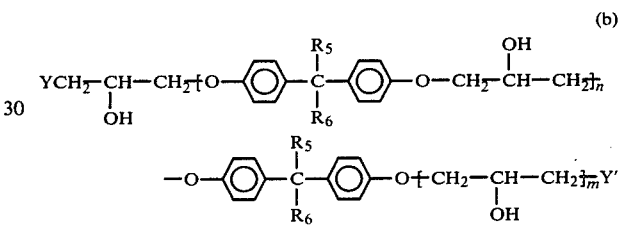

wherein $R_5$ and $R_6$ represents a hydrogen atom or an alkyl group having 1 to 10 carbon atom, n is an integer of 0 to 20, m is 1 or 0, Y represents a residue of an α,β-unsaturated monocarboxylic acid having 3 or 4 carbon atoms, and Y' is a hydrogen atom when m is 0 and Y when m is 1, or the compound of the following general formula (b')

(b')

$$\begin{matrix} CH_2-CH-CH_2Y \\ | \quad | \\ O \quad OH \end{matrix} \quad \begin{matrix} CH_2-CH-CH_2Y \\ | \quad | \\ O \quad OH \end{matrix} \quad \begin{matrix} CH_2-CH-CH_2Y \\ | \quad | \\ O \quad OH \end{matrix}$$

[benzene ring]—CH₂—[benzene ring]—CH₂—[benzene ring]
   $R_7$         $R_7$    $_{n'}$    $R_7$ when n' is an integer of 0 to 10, $R_7$ represents a hydrogen atom or a hydrocarbon group having 1 to 10 carbon atoms, and Y represents a residue of an α,β-unsaturated monocarboxylic acid having 3 or 4 carbon atoms.

The proportion of the component (B) is 3 to 100 parts by weight, preferably 10 to 50 parts by weight, per 100 parts by weight of the resin (A). If the content of the component (B) is below the specified limit, the corrosion resistance is not sufficiently improved. If it is larger than the specified limit, the dispersibility of the component (B) in water is reduced.

The compound as component (B) can be obtained by using as a starting material a glycidyl compound of the following formula

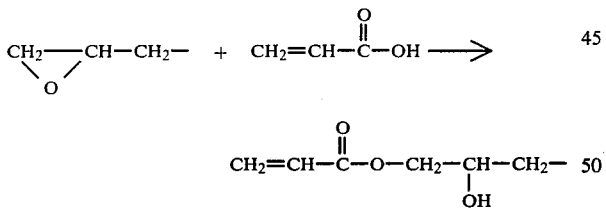

wherein $R_5$ and $R_6$ represent a hydrogen atom or an alkyl group having 1 to 10 carbon atoms, preferably a methyl or ethyl group, n is an integer of 0 to 20, preferably 1 to 5, and m is 0 or 1, preferably 1. Usually, the glycidyl compound can be produced by etherifying a bisphenol compound with epichlorohydrin in the presence of an alkali. Examples of the bisphenol compound are 2,2-bis(4'-hydroxyphenyl)propane, 1,1-bis(4'-hydroxyphenyl)ethane, and 1,1-bis(4'-hydroxyphenyl)isobutane. In many cases, a glycidyl compound having a somewhat high molecular weight is synthesized by further reacting the aforesaid glycidyl ether with bisphenol, etc. and reacting the product further with epichlorohydrin. Such a glycidyl compound can be used.

The glycidyl compound is reacted with an unsaturated carboxylic acid having 3 or 4 carbon atoms at a temperature of 0° to 200° C., preferably 50° to 150° C. The unsaturated carboxylic acid having 3 or 4 carbon atoms denotes acrylic acid, methacrylic acid, crotonic acid, etc. and a mixture of these may also be used.

The reaction may be carried out in the presence of a suitable catalyst such as a tertiary amine or a quaternary ammonium salt and in the presence or absence of a solvent. When the solvent is used, it may be the same kind of solvent as used in the step of reacting reaction with a primary or secondary amine in the synthesis of the resin (A).

The above reaction proceeds in accordance with the following scheme when acrylic acid is used as the unsaturated carboxylic acid.

$$CH_2\text{---}CH\text{---}CH_2\text{---} + CH_2=CH-\overset{O}{\underset{}{C}}-OH \longrightarrow$$
$$\underset{O}{\diagdown\diagup}$$

$$CH_2=CH-\overset{O}{\underset{}{C}}-O-CH_2-\underset{\underset{OH}{|}}{CH}-CH_2-$$

In the present invention, it is required that substantially all of the

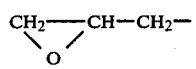

group in the glycidyl compound be converted to the group $$Y-CH_2-\underset{\underset{OH}{|}}{CH}-CH_2-$$

(Y is as defined) by reaction with the unsaturated carboxylic acid so as not to leave the group

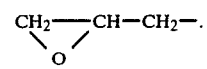

If the group

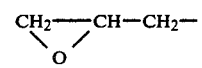

remains it will react undesirably with the basic group of the resin (A) in subsequent water-solubilization with an acid and cause gellation. As a result, the viscosity of the resin becomes too high to effect water solubilization. Even when water-solubilization can be effected, the aqueous solution changes with time, and constant electrodeposition characteristics and an electrodeposited film of constant quality cannot be obtained.

It has previously been known that bisphenol-type epoxy resins have excellent corrosion resistance, and in order to impart crosslinkability to these resins, attempts have been made to leave the epoxy group partially (Japanese Patent Publications Nos. 23807/1974 and 15860/1976), or to use a blocked isocyanate compound as a crosslinking agent. However, coating compositions based on such resins require high temperatures of, for example, at least 200° C. in order to obtain practical hardness values, and even when they can be cured at relatively low temperatures, only those baking temperatures which are within a narrow range can be selected.

Under practical electrodepositing conditions, the bisphenol-type epoxy resin having some extent of high molecular weight must be used, and this necessarily results in coated films lacking pliability. When a resin having a carbon-carbon double bond is used together with a blocked isocyanate, oxidative polymerization during baking is inhibited, and there is a tendency that a coated film having sufficient performance cannot be obtained.

It is indeed surprising therefore that according to this invention the compound (B) in which substantially all of the group

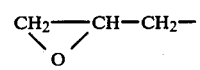

of the glycidyl compound has been converted to the group

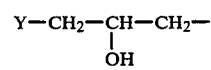

can be used as one component of a cathode-precipitating electrodeposition paint together with the resin (A), and the corrosion resistance of the resin (A) can thus be markedly improved without impairing its excellent curability and excellent film properties.

A cathode-precipitating electrodeposition paint having excellent low temperature curability can be obtained by adding 0.2 to 20 parts by weight of the component (C), i.e. an oil-soluble manganese salt of a monoester of a 1,2-dicarboxylic acid represented by the following formula

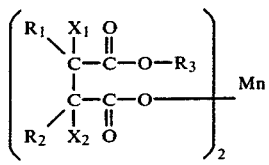

wherein $R_1$ and $R_2$ represent a hydrogen atom or an alkyl group having 1 to 20 carbon atoms, or $R_1$ and $R_2$ may be taken together to assume a six-membered ring structure or a heterocyclic structure having both a five-membered ring and a six-membered ring, which ring structure may contain an unsaturated group, $R_3$ represents an organic residue having 1 to 20 carbon atoms which may contain an ether linkage, an ester linkage and an unsaturated group, and $X_1$ and $X_2$ represent a hydrogen atom, an organic residue having 1 to 10 carbon atoms, or a bond, and when $X_1$ and $X_2$ are bonds, the carbon atoms to which $X_1$ and $X_2$ are bonded may form a double bond, or
a manganese salt of a high-molecular-weight compound containing a carbon-carbon double bond and 30 to 300 millimoles, per 100 g of the compound, of a sulfonic acid group or a succinic acid group and having a molecular weight of 300 to 3,000 and an iodine value of 50 to 500.

Generally, manganese naphthenate, manganese octenate and manganese acetylacetonate are known as oil-soluble manganese salts. These manganese salts are those of weak acids and undergo exchange reaction with a neutralizing agent such as acetic acid in aqueous solution whereby they are gradually converted to water-soluble manganese salts which reduce the stability of the resulting electrodeposition paint.

The water-soluble manganese salts increase the electrical conductivity of the electrodeposition paint and cause surface roughening of coated films. Or the curability of the coated film is reduced since the water-soluble manganese salt has a smaller effect of promoting curing than oil-soluble manganese salts. Accordingly, the use of manganese salts of weak acids, even when they are oil-soluble, is not preferred. Furthermore, since the manganese salts of weak acids do not substantially have an unsaturated group, they do not cure together with the component (A) or (B)' and this may cause degradation of the properties, such as solvent resistance, of the final baked film.

The oil-soluble manganese salt of a monoester of a 1,2-dicarboxylic acid or the oil-soluble manganese salt of sulfonic acid or succinic acid is a salt of manganese with a strong acid. Accordingly, it does not undergo exchange reaction with acetic acid, etc. as the neutralizing agent. Moreover, since it is oil-soluble, it does not increase the electrical conductivity of the electrodeposition coating composition. Accordingly, such manganese salts can be used without giving rise to the aforesaid problems.

The oil-soluble manganese salt of a monoester of a 1,2-dicarboxylic acid, represented by the following formula

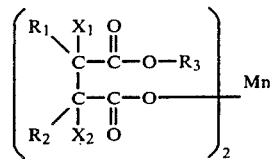

wherein $R_1$, $R_2$, $R_3$, $X_1$ and $X_2$ are as defined above, used as one component (C) in this invention can be produced by known methods. For example, it can be easily produced by a so-called decomposition method based on salt exchange reaction between a sodium salt of a monoester of a 1,2-dicarboxylic acid represented by the following formula

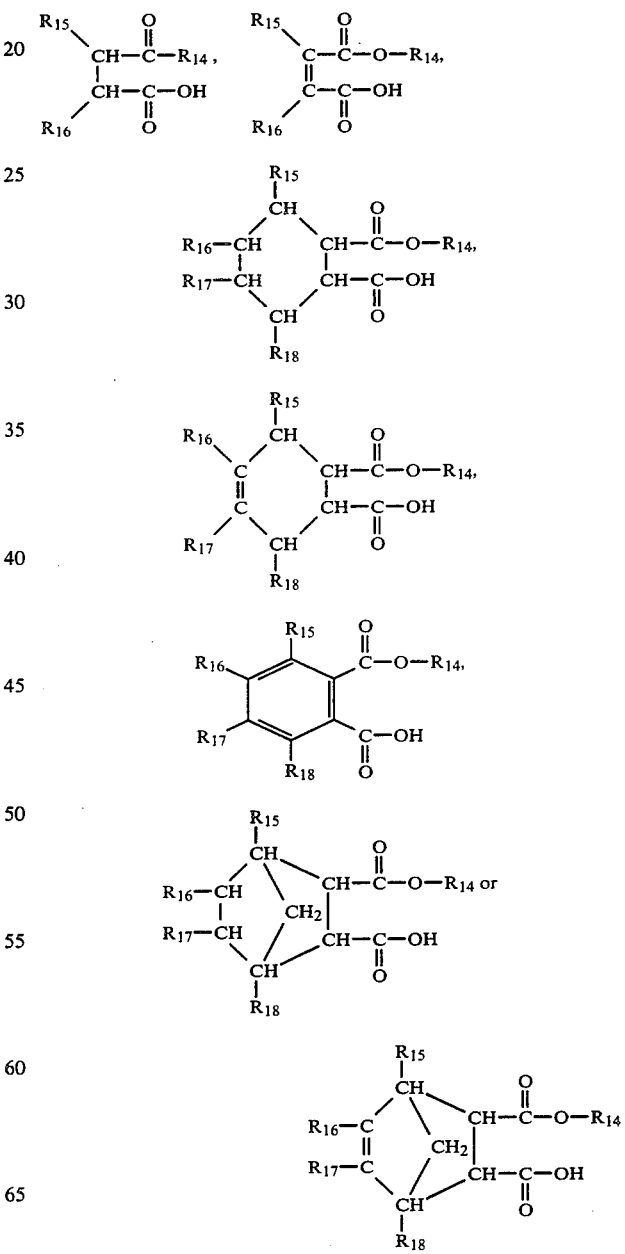

wherein $R_{14}$ represents an organic residue which may contain an ether linkage, an ester linkage and an unsaturated group, and $R_{15}$, $R_{16}$, $R_{17}$ and $R_{18}$ represent a hydrogen atom or an alkyl group having 1 to 5 carbon atoms, and manganese sulfate, manganese chloride, etc.; or by an acid exchange reaction with a manganese salt of a weak acid such as manganese acetylacetonate, manganese, mangane carbonate, and manganese acetate.

The other compound used as the component (C) in this invention, i.e. the oil-soluble manganese salt of a high-molecular-weight compound containing a carbon-carbon double bond and 30 to 300 millimoles, per 100 g of the compound, of a sulfonic acid group or a succinic acid group and having a molecular weight of 300 to 3,000 and an iodine value of 50 to 500, can also be produced by known methods. For example, it can be easily produced by sulfonating or maleinizing homopolymer or copolymer with a low degree of polymerization of a conjugated diolefin used as the starting material for the component (A) and thereafter subjecting the product to a double decomposition method based on salt exchange reaction of a sodium salt of the acid group of the polymer with manganese sulfate, manganese chloride, etc., or by acid exchange reaction with a manganese salt of a weak acid such as manganese acetylacetonate, manganese carbonate, or manganese acetate.

It the amount of the oil-soluble manganese salt as component (C) in this invention is less than 0.2 part by weight, the effect of promoting curability is small. If it is larger than 20 parts by weight, the curability is improved, but water dispersibility and corrosion resistance are undesirably reduced. The preferred amount of the component (C) is 1 to 10 parts by weight, and the preferred amount of manganese metal is 0.05 to 0.5 part by weight.

In order to dissolve or disperse the composition composed of the components (A), (B) and (C) in this invention in water, it is preferred to first mix the components (A), (B) and (C), and then to neutralize the mixture with 0.1 to 2.0 moles, preferably 0.2 to 1.0 mole, per mole of the amino group of component (A), of a water-soluble organic acid such as acetic acid, propionic acid and lactic acid.

In dissolving or dispersing the composition of this invention in water, it is preferred to use 10 to 100 parts by weight, per 100 parts by weight of the resin composition, of an organic solvent such as ethyl Cellosolve, propyl Cellosolve, butyl Cellosolve, ethylene glycol dimethyl ether, diethylene glycol dimethyl ether, diacetone alcohol, 4-methoxy-4-methylpentanone-2 or methyl ethyl ketone in order to facilitate dissolution or dispersion, increase the stability of the aqueous solution, improve the flowability of the resin, or to improve the smoothness of the coated film.

The cathode-precipitating electrodeposition coating composition of this invention may also include a suitable pigment, for example at least one of such pigments as iron oxide, lead oxide, strontium chromate, carbon black, titanium dioxide, talc, aluminum silicate or barium sulfate.

These pigments can be added as such to the composition of this invention. It is possible however to mix a part of an aqueous dispersion or solution obtained by neutralizing the component (A) with a large amount of a pigment to form a paste-like master batch, and add the paste-like pigment to the composition.

The following examples illustrate the present invention more specifically. The properties of the coated films in these examples were tested in accordance with JIS K-5400.

PRODUCTION EXAMPLE 1

Nisseki Polybutadiene B-3,000 (number average molecular weight 3,000; 1,2-bond content 68%) was epoxidized with peracetic acid to produce epoxidized polybutadiene ($E_1$) having an oxirane oxygen content of 6.2%.

A 2-liter autoclave was charged with 1,000 g of epoxidized polybutadiene ($E_1$) and 333 g of ethyl Cellosolve, and then 49.7 g of dimethylamine was added. They were reacted at 150° C. for 5 hours. The unreacted amine was evaporated, and a mixture consisting of 81.9 g of acrylic acid, 7.5 g of hydroquinone and 70 g of ethyl Cellosolve was added, and the reaction was further carried out at 150° C. for 45 minutes to produce a solution ($A_1$) of the resin as component (A). It has an amine value of 70 millimoles/100 g, an acid value of 10 millimoles/100 g, and a solids concentration of 75.0% by weight.

PRODUCTION EXAMPLE 2

Nisseki Polybutadiene B-1,800 (number average molecular weight 1800, 1,2-bond content 64%) was epoxidized with peracetic acid to produce epoxidized polybutadiene ($E_2$) having an oxirane oxygen content of 6.5%.

A 3-liter separable flask was charged with 1,000 g of the epoxidized polybutadiene ($E_2$), 358 g of ethyl Cellosolve and 75.1 g of methyethanolamine, and they were reacted at 150° C. for 6 hours. After the reaction, the reaction mixture was cooled to 120° C., and a mixture consisting of 79.2 g of acrylic acid, 7.2 g of hydroquinone and 27 g of ethyl Cellosolve was added. The reaction was further carried out at 120° C. for 8 hours to form a solution ($A_2$) of the resin as component A of this invention.

It had an amine value of 62 millimoles/100 g, an acid value of 11 millimoles/100 g, and a solids concentration of 75% by weight.

PRODUCTION EXAMPLE 3

A 2-liter separable flask equipped with a reflux condenser was charged with 1,000 g of Nisseki Polybutadiene B-2000 (number average molecular weight 2000; 1,2-bond content 65%), 168 g of maleic anhydride, 10 g of xylene and 2 g of Antigen 3C (a trademark for a product of Sumitomo Chemical Co., Ltd.), and they were reacted at 190° C. for 5 hours in a stream of nitrogen. The unreacted maleic anhydride and xylene were evaporated under reduced pressure to synthesize maleinized polybutadiene ($M_1$) having an acid value of 143 millimoles/100 g.

Then, a 2-liter separable flask equipped with a reflux condenser was charged with 1,000 g of the maleinized polybutadiene ($M_1$) and 200 g of ethyl Cellosolve, and with stirring, they were heated to 80° C. Then, 149 g of β-hydroxyethylethylenediamine was added dropwise. After the addition, the mixture was immediately heated to 150° C., and the reaction was continued at 150° C. for 5 hours. The resulting water, the ethyl Cellosolve and the unreacted amine were evaporated under reduced pressure to synthesize imidized polybutadiene having a secondary amine group and a hydroxyl group. The imidized polybutadiene had an amine valuue of 132 millimoles/100 g. The imidized polybutadiene was dissolved in ethyl Cellosolve so that its solids content become 75% by weight. Thus, a solution (A₃) of the resin as component (A) in this invention was produced.

PRODUCTION EXAMPLE 4

One thousand grams of bisphenol-type epoxy resin having an epoxy equivalent of 500 L (Epikote 1001, a trademark for a product of Shell Chemical Co.), which was a compound of the following formula

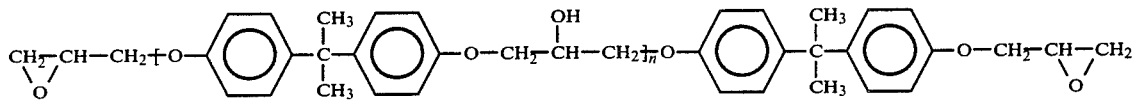

obtained by reacting bisphenol A with epichlorohydrin in the presence of an alkaline catalyst, was dissolved in 227 g of ethyl Cellosolve, and 137 g of acrylic acid, 0.2 g of hydroquinone and 5 g of N,N-dimethylaminoethanol were added. The mixture was heated to 100° C. and reacted for 5 hours to synthesize an ethyl Cellosolve solution (B₁) of the epoxy resin-acrylic acid adduct which is the component (B) of this invention.

PRODUCTION EXAMPLE 5

One thousand grams of bisphenol-type epoxy resin having an epoxy equivalent of 500 (Epikote 1001, a trademark for a product of Shell Chemical Co.) was dissolved in 288 g of ethyl Celloslve, and 164 g of methacrylic acid, 0.2 g of hydroquinone and 5 g of N,N-dimethylaminoethanol were added. Under the same conditions as in Production Example 4, an ethyl Cellosolve solution (B₂) of the epoxy resin-methacrylic acid adduct which is the component (B) of the invention was synthesized.

PRODUCTION EXAMPLE 6

A 3-liter separable flask equipped with a bottom valve was charged with 3332.4 g of 4-methyltetrahydrophthalic anhydride and 286.4 g of 2-ethylhexanol, and they were reacted at 120° C. for 2 hours to convert the anhydride to a half ester. The reaction product was then cooled to room temperature, and 334 g of a 25% by weight aqueous solution of sodium hydroxide was added gradually to neutralize the product. Then, 1,238 g of an aqueous solution containing 1,000 g of benzene and 238 g of manganese chloride (MnCl₂.4H₂O) was added. The mixture was vigorously stirred at room temperature for 1 hour, and then left to stand for 2 hours. It separated into two layers. The lower layer was removed, and 1000 g of deionized water was added to the upper layer, and the mixture was vigorously stirred, and then left to stand for 2 hours. The lower layer was removed.

The upper layer was withdrawn, and benzene, etc. were evaporated under reduced pressure to give an oil-soluble manganese salt (C₁) of the component (C) of this invention represented by the following formula:

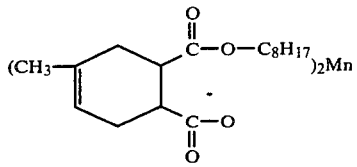

PRODUCTION EXAMPLE 7

A 3-liter separable flask equipped with a bottom valve was charged with 196 g of maleic anhydride, 409 g of dodecyl alcohol, and 20 g of benzene, and they were reacted at 125° C. for 3 hours to convert maleic anhydride to a half-ester. The product was then cooled to room temperature, and 334 g of a 25% by weight aqueous solution of sodium hydroxide was gradually added to neutralize the product. Then, 1,238 g of an aqueous solution containing 1,000 g of benzene and 238 g of manganese chloride (MnCl₂.4H₂O) was added. The mixture was vigorously stirred at room temperature for 1 hour. Then, the mixture was left to stand for 2 hours, whereupon it separated into two layers. The lower layer was removed, and 1,000 g of deionized water was added to the upper layer. The mixture was vigorously stirred at room temperature for 1 hour, and then left to stand for 2 hours. The lower layer was removed.

The upper layer was withdrawn, and benzene, etc. were evaporated under reduced pressure to give an oil-soluble manganese salt (C₂) as component (C) of this invention represented by the following formula:

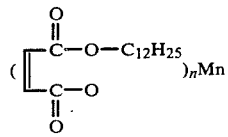

PRODUCTION EXAMPLE 8

A 3-liter separable flask equipped with a bottom valve was charged with 356.4 g of methyl-5-norbornene-2,3-dicarboxylic anhydride, and 198.2 g of ethyl Cellosolve, and they were reacted at 120° C. for 2 hours to convert the anhydride to a half ester. The product was then cooled to room temperature, and neutralized by gradually adding 334 g of a 25% aqueous by weight aqueous solution of sodium hydroxide. Then, 1,268 g of an aqueous solution containing 800 g of benzene and 268 g of manganese sulfate (MnSO₄.4H₂O) was added, and the mixture was vigorously stirred at room temperature for 1 hour and then left to stand for 2 hours. It separated into two layers. The lower layer was removed, and 1,000 g of deionized water was added to the upper layer. The mixture was vigorously stirred at room temperature for 1 hour and left to stand for 2 hours. The lower layer was removed.

The upper layer was withdrawn, and benzene, ect. were evaporated under reduced pressure to synthesize an oil-soluble manganese salt of the following formula:

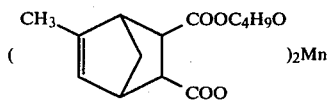

The oil-soluble manganese salt was dissolved in ethyl Cellosolve so that its solids content became 75% by weight. Thus, a solution (C₃) of the oil-soluble manganese salt as component (C) was prepared. The solution (C₃) contained 7.0% by weight of manganese.

EXAMPLE 1

Four hundred grams of (A₁) produced in Production Example 1, 108.4 g of (B₁) produced in Production Example 4 and 18 g of (C₁) produced in Production Example 6 were uniformly mixed, and 8.4 g of acetic acid was added. The mixture was fully stirred for neutralization. Deionized water was gradually added to prepare an aqueous solution having a solids concentration of 20% by weight.

Two thousand grams of the resulting 20% by weight aqueous solution, 4 g of carbon black, 20 g of basic lead silicate and 2,000 g of glass beads were put in a 5-liter stainless steel beaker and vigorously stirred by a high-speed rotating mixer for 2 hours. The glass beads were removed by filtration, and then deionized water was added to prepare an electrodeposition coating solution having a solids concentration of 15% by weight.

From the resulting electrodeposition coating solution, cathode-precipitating electrodeposition coating was carried out using a carbon electrode as an anode and a zinc phosphate-treated plate (Bt3004 manufactured by Japan Test Panel Co., Ltd.; 0.8×70×150 mm) as a cathode.

The coated plate was tested and the results are shown in Table 1.

COMPARATIVE EXAMPLE 1

A cathode-precipitating electrodeposition coating solution was prepared under the same conditions as in Example 1 except that C₁ produced in Production Example 6 was not added. The resulting electrodeposition coating was coated and tested under the same conditions as in Example 1. The results are shown in Table 1.

COMPARATIVE EXAMPLE 2

A cathode-precipitating electrodeposition coating solution was prepared under the same conditions as in Example 1 except that manganese acetate was added in an amount of 1.56 g as manganese instead of C₁ produced in Production Example 6. The resulting electrodeposition coating solution was coated and tested under the same conditions as in Example 1. The results are shown in Table 1.

TABLE 1

|  |  | Example 1 |  | Comparative Example 1 |  | Comparative Example 2 |  |
|---|---|---|---|---|---|---|---|
| Characteristics of the coating solution | pH | 6.4 |  | 6.3 |  | 6.6 |  |
|  | Electric conductivity (mΩ/cm) | 1.7 |  | 1.5 |  | 2.0 |  |
| Electrodeposition properties | Film breakdown voltage (V) | 340 |  | 360 |  | 300 |  |
|  | Film resistance (KΩ · cm²) (*1) | 800 |  | 1000 |  | 600 |  |
|  | Coulomb efficiency (mg/C) | 18 |  | 20 |  | 12 |  |
| Coating conditions | Voltage (V) | 260 |  | 280 |  | 210 |  |
|  | Time (minutes) | 3 |  | 3 |  | 3 |  |
| Baking conditions (°C. × 30 minutes) |  | 130 | 150 | 130 | 150 | 130 | 150 |
| Film thickness (μ) |  | 20 | 19 | 19 | 20 | 20 | 20 |
| Physical tests | Pencil hardness | H | 2H | <6B | <6B | <6B | 2B |
|  | Erichsen (mm) | >7 | 6.5 | (*5) | (*5) | (*5) | >7 |
|  | Impact strength (cm) (*2) |  |  |  |  |  |  |
|  | Surface | >50 | >50 | (*5) | (*5) | (*5) | >50 |
|  | Back | >50 | >50 | (*5) | (*5) | (*5) | >50 |
| Chemical tests | Solvent resistance (*3) | ○ | ○ | X | X | X | X |
|  | Corrosion resistance, 500 hours (*4) | ◎ | ◎ | X | X | X | Δ |

(*1) Calculated from the following formula:
$$\frac{\text{Coating voltage (V)}}{\text{Residual current (A)}} \times [\text{Surface area (cm}^2\text{) of the test panel}]$$
(*2) The maximum height of a ball fall which does not cause breakage of the coated film (500 g, ½B).
(*3) A rubbing test by using methyl isobutyl ketone (50 times per minute). The results are evaluated as follows:
○: No change
Δ: the rubbed portion becomes cloudy
X: The substrate is exposed.
(*4) The maximum rust width (mm) from a cut portion provided in the coated film (a spray of a 5% sodium chloride solution). The results are evaluated on the following scale.
◎: less than 1 mm
○: 1 to 2 mm
Δ: more than 2 mm to 3 mm
X: more than 3 mm
(*5) Since the coated film had marked stickiness, the test could not be conducted.

EXAMPLE 2

Four hundred grams of A₂ produced in Production Example 2, 75 g of B₂ produced in Production Example 5 and 7.2 g of C₂ produced in Production Example 7 were uniformly mixed, and then 7.4 g of acetic acid was added. The mixture was fully stirred for neutralization. Deionized water was gradually added to prepare an aqueous solution having a solids concentration of 25% by weight. One thousand grams of the 25% by weight aqueous solution, 2.5 g of carbon black, 25 g of basic lead silicate and 1,000 g of glass beads were put in a 3-liter stainless steel beaker, and vigorously stirred for 2 hours. The glass beads were removed by filtration, and deionized water was added to prepare an electrodepositing coating solution having a solids concentration of 18%. Cathode-precipitating electrodeposition coating was carried out from the resulting electrodeposition coating solution using a carbon electrode as an anode and a zinc phosphate treated panel (Bt3004 manufactured by Nippon Test Panel Co., Ltd; 0.8×70×150 mm) as a cathode. The results are shown in Table 2.

COMPARATIVE EXAMPLE 3

A cathode-precipitating electrodeposition coating solution was prepared under the same conditions as in Example 2 except that $C_2$ produced in Production Example 7 was not added. The resulting electrodeposition coating solution was coated and tested under the same conditions as in Example 2. The results are shown in Table 2.

COMPARATIVE EXAMPLE 4

A cathode-precipitating electrodeposition coating solution was prepared under the same conditions as in Example 2 except that manganese acetate was added in an amount of 0.78 g as manganese instead of $C_2$ produced in Production Example 7. The resulting electrodeposition coating solution was coated and tested under the same conditions as in Example 2. The results are shown in Table 2.

aqueous solution having a solids concentration of 30% by weight.

One thousand grams of the resulting 30% by weight aqueous solution, 3 g of carbon black, 20 g of basic lead silicate and 1,000 g of glass beads were put in a 3-liter stainless steel beaker, and vigorously stirred for 2 hours by a high-speed rotating mixer. The glass beads were removed by filtration, and deionized water was added to prepare an electrodeposition coating solution having a solids concentration of 16%.

Cathode-precipitating electrodeposition was carried out from the resulting electrodeposition coating solution using a carbon electrode as an anode and a zinc phosphate treated panel (Bt3004 manufactured by Nippon Test Panel Co., Ltd.; 0.8×70×150 mm) as a cathode. The coated film waas tested, and the results are shown in Table 3.

COMPARATIVE EXAMPLE 5

A cathode-precipitating electrodeposition coating solution was prepared under the same conditions as in Example 3 except that $C_3$ produced in Production Example 8 was not added. The resulting electrodeposition coating solution was coated and tested under the same conditions as in Example 3. The results are shown in Table 3.

TABLE 2

| | | Example 2 | | Comparative Example 3 | | Comparative Example 4 | |
|---|---|---|---|---|---|---|---|
| Characteristics of the coating solution | pH | 6.3 | | 6.2 | | 6.4 | |
| | Electric conductivity (mΩ/cm) | 1.5 | | 1.3 | | 1.8 | |
| Electrodeposition properties | Film breakdown voltage (V) | 310 | | 330 | | 300 | |
| | Film resistance (KΩ·cm$^2$) (*1) | 650 | | 800 | | 500 | |
| | Coulomb efficiency (mg/C) | 21 | | 19 | | 15 | |
| Coating conditions | Voltage (V) | 210 | | 230 | | 200 | |
| | Time (minutes) | 3 | | 3 | | 3 | |
| Baking conditions (°C. × 30 minutes) | | 140 | 160 | 140 | 160 | 140 | 160 |
| Film thickness (μ) | | 20 | 20 | 19 | 20 | 19 | 20 |
| Physical tests | Pencil hardness | H | 3H | <6B | <6B | 4B | 2H |
| | Erichsen (mm) | >7 | 6.6 | (*5) | >7 | >7 | >7 |
| | Impact strength (cm) (*2) | | | | | | |
| | Surface | >50 | >50 | (*5) | >50 | >50 | >50 |
| | Back | >50 | >50 | (*5) | >50 | >50 | >50 |
| Chemical tests | Solvent resistance (*3) | ○ | ○ | X | X | Δ | ○ |
| | Corrosion resistance, 500 hours (*4) | ◎ | ◎ | X | X | X | ◎ |

(*1) to (*5):
Same as footnote to Table 1.

EXAMPLE 3

Four hundred grams of $A_3$ produced in Production Example 8, 108.4 g of $B_1$ produced in Production Example 4, and 17.1 g of $C_3$ produced in Production Example 8 were mixed uniformly, and 15 g of acetic acid was added. The mixture was fully stirred for neutralization. Deionized water was gradually added to prepare an

COMPARATIVE EXAMPLE 6

A cathode-precipitating electrodeposition coating solution was prepared under the same conditions as in Example 3 except that manganese acetate was added in an amount of 1.2 g as manganese instead of $C_3$ produced in Production Example 8. The resulting electrodeposition coating solution was coated and tested under the same conditions as in Example 3. The results are shown in Table 3.

TABLE 3

| | | Example 3 | Comparative Example 5 | Comparative Example 6 |
|---|---|---|---|---|
| Characteristics of the coating solution | pH | 6.3 | 6.3 | 6.5 |
| | Electric conductivity (mΩ/cm) | 1.7 | 1.6 | 2.0 |
| Electrodeposition properties | Film breakdown voltage (V) | 300 | 350 | 330 |
| | Film resistance (KΩ·cm$^2$) (*1) | 400 | 500 | 400 |
| | Coulomb efficiency (mg/C) | 16 | 14 | 12 |
| Coating | Voltage (V) | 230 | 260 | 210 |

TABLE 3-continued

|  |  | Example 3 |  | Comparative Example 5 |  | Comparative Example 6 |  |
| --- | --- | --- | --- | --- | --- | --- | --- |
| conditions | Time (minutes) | 3 |  | 3 |  | 3 |  |
| Baking conditions (°C. × 30 minutes) |  | 150 | 170 | 150 | 170 | 150 | 170. |
| Film thickness ($\mu$) |  | 20 | 20 | 20 | 20 | 20 | 20 |
| Physical tests | Pencil hardness | 2H | 3H | <6B | <6B | <6B | H |
|  | Erichsen (mm) | >7 | 6.0 | (*5) | (*5) | (*5) | >7 |
|  | Impact strength (cm) (*2) |  |  |  |  |  |  |
|  | Surface | >50 | >50 | (*5) | (*5) | (*5) | >50 |
|  | Back | >50 | >50 | (*5) | (*5) | (*5) | >50 |
| Chemical tests | Solvent resistance (*3) | ○ | ○ | X | X | X | ○ |
|  | Corrosion resistance, 500 hours (*4) | ◎ | ◎ | X | X | X | ○ |

(*1) to (*5): Same as the footnote to Table 1.

PRODUCTION EXAMPLE 9

Nisseki Polybutadiene B-2000 (number average molecular weight 2,000; 1,2-bond content 65%) was epoxidized with peracetic acid to produce epoxidized polybutadiene ($E_3$) having an oxirane oxygen content of 6.3%.

A 2-liter autoclave was charged with 1,076 g of the epoxidized polybutadiene ($E_3$) and 108 g of ethyl Cellosolve, and 40 g of dimethylamine was then added. They were reacted at 150° C. for 5 hours. The unreacted amine was distilled off, and a mixture consisting of 95 g of acrylic acid, 8 g of hydroquinone and 260 g of ethyl Cellosolve was added, and the reaction was carried out further at 150° C. for 45 hours to produce a solution of a resin as component (A) of this invention ($A_4$). The product had an amine value of 50 millimoles/100 g, an acid value of 5 millimoles/100 g and a solids concentration of 75.0% by weight.

PRODUCTION EXAMPLE 10

Nisseki Polybutadiene B-1500 (number average molecular weight 1500; 1,2-bond content 63%) was epoxidized with peracetic acid to produce epoxidized polybutadiene ($E_4$) having an oxirane oxygen content of 6.5%.

A 3-liter separable flask was charged with 1,000 g of the epoxidized polybutadiene ($E_4$), 368 g of ethyl Cellosolve, and 105 g of diethanolamine, and they were reacted at 150° C. for 6 hours. After the reaction, the reaction mixture was cooled to 120° C., and a mixture consisting of 79 g of acrylic acid, 7.3 g of hydroquinone and 26 g of ethyl Cellosolve was added. The reaction was carried out further at 120° C. for 8 hours to give a resin solution ($A_5$) as component A of the present invention. The product had an amine value of 62 millimoles/100 g, an acid value of 12 millimoles/100 g, and a solids concentration of 75% by weight.

PRODUCTION EXAMPLE 11

A 2-liter separable flask equipped with a reflux condenser was charged with 803 g of maleinized polybutadiene ($M_1$) obtained in Production Example 3, and with stirring, they were heated to 80° C. Then, 78 g of dimethylaminopropylamine was added dropwise, and then 23 g of monoethanolamine was further added dropwise. After the addition, the mixture was heated immediately to 150° C., and reacted at 150° C. for 4 hours. The generated water, the butyl Cellosolve and the unreacted amine were distilled off under reduced pressure to synthesize imidized polybutadiene having a tertiary amine group and a hydroxyl group. The imidized polybutadiene had an amine value of 89 millimoles/100 g. The imidized polybutadiene was dissolved in ethyl Cellosolve so as to prepare a solution having a solids concentration of 80% by weight. Thus, a resin solution ($A_6$) as component (A) of this invention was prepared.

PRODUCTION EXAMPLE 12

One thousand grams of Nisseki Polybutadiene B-700 (number average molecular weight 700, 1,2-bond content 52%), 117.3 g of maleic anhydride, 1 g of Antigen 3C and 10 g of xylene were charged into a 2-liter separable flask equipped with a reflux condenser, and reacted in a stream of nitrogen at 195° C. for 5 hours. The unreacted maleic anhydride and xylene were distilled off under reduced pressure to synthesize maleinized polybutadiene ($M_2$) having an acid value of 107 millimoles/100 g. Five hundred grams of the maleinized polybutadiene ($M_2$) and 148 g of ethyl Cellosolve were reacted at 120° C. for 2 hours to ring-open the succinic anhydride group. The product was then cooled to room temperature, and 100 g of a 22.5% by weight aqueous solution of sodium hydroxide was gradually added to neutralize the resin, and then deionized water was added to prepare an aqueous solution of the maleinized polybutadiene having a solids concentration of 25% by weight.

Manganese sulfate ($MnSO_4 \cdot H_2O_{4.5}$; 74.5 g) was dissolved in 600 g of water, and then 600 g of isopropyl alcohol and 1,000 g of benzene were added. With stirring, 2192 g, of the aforesaid aqueous solution of maleinized polybutadiene was gradually added dropwise at room temperature. After the addition, the mixture was heated at 60° C. for 30 minutes, and then left to stand, whereupon it separated into two layers. The lower layer was removed, and 1000 g of deionized water was added to the upper layer, and the mixture was heated at 60° C. for 30 minutes. The mixture was left to stand for 1 hours. The lower layer was removed. The upper layer was taken out, and benzene, etc. were evaporated under reduced pressure to produce a manganese salt of the maleinized polybutadiene by a double decomposition method.

The manganese salt of maleinized polybutadiene was dissolved in ethyl Cellosolve to prepare a solution having a solids concentration of 75% by weight. Thus, a solution ($C_4$) of an oil-soluble manganese salt as component (C) of the invention was prepared. The solution ($C_4$) contained 2% by weight of manganese.

PRODUCTION EXAMPLE 13

One thousand grams of Nisseki Polybutadiene B-1500, 117.3 g of maleic anhydride, 2 g of Antigen 3C and 10 g of xylene were charged into a 2-liter separable flask equipped with a reflux condenser, and reacted at 195° C. for 5 hours in a stream of nitrogen. The unreacted maleic anhydride and xylene were evaporated under reduced pressure to synthesize maleinized polybutadiene ($M_3$) having an acid value of 107 millimoles/100 g.

Then, 250 g of the maleinized polybutadiene ($M_3$) and 220 g of ethyl Cellosolve was charged into a 1-liter separable flask equipped with a reflux condenser and a Liebig condenser, and reacted at 120° C. for 2 hours to ring-open the succinic anhydride group. Then, 175.7 g of an aqueous solution containing 46.4 g of manganese acetate dissolved therein was added. The mixture was heated to 120° C. to evaporate water, acetic acid and ethyl Cellosolve at atmospheric pressure. The pressure was then reduced, and acetic acid and ethyl Cellosolve were distilled off to produce a manganese salt of the maleinized polybutadiene by an acid exchange method.

The resulting manganese salt of maleinized polybutadiene was dissolved in ethyl Cellosolve so as to provide a solids concentration of 75% by weight. Thus, a solution ($C_5$) of an oil-soluble manganese salt as component (C) of this invention was prepared. The solution ($C_5$) contained 3.6% by weight of manganese.

PRODUCTION EXAMPLE 14

One hundred grams of Nisseki Polybutadiene H-700 was taken into a 2-liter separable flask equipped with a reflux condenser and a dropping funnel. Dehydrated dichloroethane (1,200 ml) was added to dissolve the polybutadiene. The solution was cooled to 5° C. While maintaining the solution at 5° C., a $SO_3$-dioxane (1:1) complex synthesized from 11.4 g of $SO_3$ and 12.6 g of dehydrated 1,4-dioxane dissolved in 100 ml of dehydrated dichloroethane was added dropwise in a stream of nitrogen over the course of 60 minutes. After the addition, the mixture was aged at the same temperature for 30 minutes to prepare a solution of sulfonated polybutadiene ($S_1$). In a 2-liter separable flask, 9.1 g of $MnCO_3$ and 18.2 g of water were vigorously stirred, and the aged ($S_1$) solution was added dropwise to the stirred mixture in a nitrogen stream over 5 minutes. After the addition, the mixture was heated at 60° C. for 30 minutes to complete hydrolysis. By evaporating the solvent from the reaction solution, a brown semi-solid manganese salt of sulfonated polybutadiene was produced by an acid exchange reaction.

The manganese salt of sulfonated polybutadiene was dissolved in ethyl Cellosolve so as to provide a solid concentration of 75% by weight. Thus, a solution ($C_6$) of an oil-soluble manganese salt as component (C) of the invention was prepared. The solution ($C_6$) contained 2.8% by weight of manganese.

EXAMPLE 4

Four hundred grams of $A_4$ produced in Production Example 9, 108.4 g of $B_1$ produced in Production Example 4 and 45 g of $C_4$ produced in Production Example 12 were uniformly mixed, and 6 g of acetic acid was added. The mixture was fully stirred for neutralization. Then, deionized water was gradually added to prepare an aqueous solution having a solids concentration of 20% by weight.

Two thousand grams of the resulting 20% by weight aqueous solution, 4 g of carbon black, 20 g of basic lead silicate and 2,000 g of glass beads were put in a 5-liter stainless steel beaker, and vigorously stirred for 2 hours by a high-speed rotating mixer. The glass beads were removed by filtration, and deionized water was added to prepare an electrodeposition coating solution having a solids concentration of 15% by weight.

Cathode precipitating electrodeposition coating solution was carried out from the resulting electrodeposition coating solution using a carbon electrode as an anode and a zinc phosphate treated panel (Bt3004 produced by Nippon Test Panel Co., Ltd.; $0.8 \times 70 \times 150$ mm) as a cathode. The coated panel was tested and the results are shown in Table 4.

COMPARATIVE EXAMPLE 7

A cathode-precipitating electrodeposition coating solution was prepared under the same conditions as in Example 4 except that $C_4$ produced in Production Example 12 was not added. The resulting electrodeposition coating solution was coated and tested under the same conditions as in Example 4. The results are shown in Table 4.

COMPARATIVE EXAMPLE 8

A cathode-precipitating electrodeposition coating solution was prepared under the same conditions as in Examle 4 except that manganese acetate was added in an amount of 0.9 g as manganese instead of $C_4$ produced in Production Example 12. The resulting electrodeposition coating solution was coated and tested under the same conditions as in Example 4. The results are shown in Table 4.

TABLE 4

| | | Example 4 | | Comparative Example 7 | | Comparative Example 8 | |
|---|---|---|---|---|---|---|---|
| Characteristics of the coating solution | pH | 6.3 | | 6.3 | | 6.5 | |
| | Electric conductivity (mΩ/cm) | 1.4 | | 1.4 | | 1.7 | |
| Electrodeposition properties | Film breakdown voltage (V) | 300 | | 300 | | 350 | |
| | Film resistance (KΩ · cm$^2$) (*1) | 500 | | 800 | | 400 | |
| | Coulomb efficiency (mg/C) | 22 | | 18 | | 16 | |
| Coating conditions | Voltage (V) | 150 | | 250 | | 230 | |
| | Time (minutes) | 3 | | 3 | | 3 | |
| Baking conditions (°C. × 30 minutes) | | 140 | 160 | 140 | 160 | 140 | 160 |
| Film thickness (μ) | | 20 | 19 | 19 | 20 | 20 | 20 |
| Physical tests | Pencil hardness | H | 2H | <6B | <6B | <6B | H |
| | Erichsen (mm) | >7 | 6.5 | (*5) | (*5) | >7 | >7 |
| | Impact strength (cm) (*2) | | | | | | |
| | Surface | >50 | >50 | (*5) | (*5) | >50 | >50 |
| | Back | >50 | >50 | (*5) | (*5) | >50 | >50 |
| Chemical tests | Solvent resistance (*3) | ○ | ○ | X | X | X | ○ |

TABLE 4-continued

|  | Example 4 | | Comparative Example 7 | | Comparative Example 8 | |
|---|---|---|---|---|---|---|
| Corrosion resistance, 500 hours (*4) | ◎ | ◎ | X | X | X | ◎ |

(*1) to (*5):
Same as footnote to Table 1.

EXAMPLE 5

Four hundred grams of $A_5$ produced in Production Example 10, 75 g of $B_2$ produced in Production Example 5 and 16.7 g of $C_5$ produced in Production Example 13 were uniformly mixed, and 7.4 g of acetic acid was added. The mixture was stirred fully for neutralization. Deionized water was then added gradually to prepare an aqueous solution having a solids concentration of 25% by weight. One thousand grams of the 25% by weight aqueous solution, 2.5 g of carbon black, 25 g of basic lead silicate and 1,000 g of glass beads were put in a 3-liter stainless steel beaker, and vigorously stirred for 2 hours by a high-speed rotating mixer. The glass beads were removed by filtration, and deionized water was added to provide an electrodeposition coating solution having a solids concentration of 18%.

Cathode-precipitating electrodeposition coating was carried out from the resulting electrodeposition coating solution using a carbon electrode as an anode and a zinc phosphate treated panel (Bt3004 manufactured by Nippon Test Panel Co., Ltd.; 0.8×70×150 mm) as a cathode. The coated panel was tested, and the results are shown in Table 5.

COMPARATIVE EXAMPLE 9

A cathode-precipitating electrodeposition coating solution was prepared under the same conditions as in Example 5 except that $C_5$ produced in Production Example 13 was not added. The resulting electrodeposition coating solution was coated and tested under the same conditions as in Example 5. The results are shown in Table 5.

COMPARATIVE EXAMPLE 10

A cathode precipitating electrodeposition coating solution was prepared under the same conditions as in Example 5 except that manganese acetate was added in an amount of 0.6 g as manganese instead of $C_5$ produced in Production Example 13. The resulting electrodeposition coating solution was coated and tested under the same conditions as in Example 5. The results are shown in Table 5.

TABLE 5

| | | Example 5 | | Comparative Example 9 | | Comparative Example 10 | |
|---|---|---|---|---|---|---|---|
| Characteristics of the coating solution | pH | 6.3 | | 6.3 | | 6.4 | |
| | Electric conductivity (mΩ/cm) | 1.3 | | 1.3 | | 1.7 | |
| Electrodeposition properties | Film breakdown voltage (V) | 320 | | 330 | | 330 | |
| | Film resistance (KΩ · cm²) (*1) | 600 | | 700 | | 500 | |
| | Coulomb efficiency (mg/C) | 20 | | 18 | | 15 | |
| Coating conditions | Voltage (V) | 200 | | 230 | | 220 | |
| | Time (minutes) | 3 | | 3 | | 3 | |
| Baking conditions (°C. × 30 minutes) | | 150 | 170 | 150 | 170 | 150 | 170 |
| Film thickness (μ) | | 20 | 20 | 19 | 20 | 19 | 20 |
| Physical tests | Pencil hardness | 2H | 3H | <6B | <6B | 4B | 2H |
| | Erichsen (mm) | >7 | 6.0 | (*5) | >7 | >7 | >7 |
| | Impact strength (cm) (*2) | | | | | | |
| | Surface | >50 | >50 | (*5) | >50 | >50 | >50 |
| | Back | >50 | >50 | (*5) | >50 | >50 | >50 |
| Chemical tests | Solvent resistance (*3) | ○ | ○ | X | X | X | ○ |
| | Corrosion resistance, 500 hours (*4) | ◎ | ◎ | X | X | X | ◎ |

(*1) to (*5):
Same as the footnote to Table 1.

EXAMPLE 6

Four hundred grams of $A_6$ produced in Production Example 11, 108.4 g of $B_1$ produced in Production Example 4 and 30 g of $C_6$ produced in Production Example 14 were uniformly mixed, and 10 g of acetic acid was added. The mixture was fully stirred for neutralization. Deionized water was graduallly added to prepare an aqueous solution having a solids concentration of 30% by weight.

One thousand grams of the 30% by weight aqueous solution, 3 g of carbon black, 20 g of basic lead silicate and 1,000 g of glass beads were in a 3-liter stainless steel beaker and vigorously stirred for 2 hours by a high-speed rotating mixer. The glass beads were removed by filtration, and deionized water was added to prepare an electrodeposition coating solution having a solids concentration of 16%.

Cathode-precipitating electrodeposition coating was carried out from the resulting electrodeposition coating solution using a carbon electrode as an anode and a zinc phosphate treated panel (Bt3004 manufactured by Nippon Test Panel Co., Ltd.; 0.8×70×150 mm) as a cathode. The coated panel was tested, and the results are shown in Table 6.

COMPARATIVE EXAMPLE 11

A cathode-precipitating electrodeposition coating solution was prepared under the same conditions as in Example 6 except that $C_6$ produced in Production Example 14 was not added. The resulting electrodeposition coating solution was coated and tested under the same conditions as in Example 6. The results are shown in Table 6.

COMPARATIVE EXAMPLE 12

A cathode-precipitating electrodeposition coating solution was prepared under the same conditions as in Example 6 except that manganese acetate was added in an amount of 0.84 g as manganese instead of $C_6$ produced in Production Example 14. The resulting electrodeposition coating solution was coated and tested under the same conditions as in Example 6. The results are shown in Table 6.

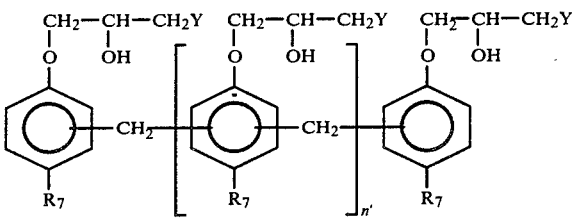

wherein n' is an integer of 0 to 10, $R_7$ represents a

TABLE 6

|  |  | Example 6 | | Comparative Example 11 | | Comparative Example 12 | |
|---|---|---|---|---|---|---|---|
| Characteristics of the coating solution | pH | 6.5 | | 6.5 | | 6.6 | |
|  | Electric conductivity (mΩ/cm) | 1.4 | | 1.4 | | 1.7 | |
| Electrodeposition properties | Film breakdown voltage (V) | 30 | | 350 | | 330 | |
|  | Film resistance (KΩ · cm²) (*1) | 400 | | 500 | | 400 | |
|  | Coulomb efficiency (mg/C) | 18 | | 15 | | 14 | |
| Coating conditions | Voltage (V) | 220 | | 250 | | 230 | |
|  | Time (minutes) | 3 | | 3 | | 3 | |
| Baking conditions (°C. × 30 minutes) |  | 160 | 180 | 160 | 180 | 160 | 180 |
| Film thickness (μ) |  | 20 | 20 | 20 | 20 | 20 | 20 |
| Physical tests | Pencil hardness | 2H | 3H | <6B | <6B | <6B | H |
|  | Erichsen (mm) | >7 | 6.0 | (*5) | >7 | (*5) | >7 |
|  | Impact strength (cm) (*2) |  |  |  |  |  |  |
|  | Surface | >50 | >50 | (*5) | >50 | (*5) | >50 |
|  | Back | >50 | >50 | (*5) | >50 | (*5) | >50 |
| Chemical tests | Solvent resistance (*3) | ○ | ○ | X | X | X | ○ |
|  | Corrosion resistance, 500 hours (*4) | ◎ | ◎ | X | X | X | ○ |

(*1) to (*5): Same as the footnote to Table 1.

What is claimed is:

1. A resin composition suitable for use in a cathode-precipitating electrodeposition coating composition having excellent low-temperature curability consisting essentially of:
   (A) 100 parts by weight of a high-molecular-weight compound containing a carbon-carbon double bond and 30 to 300 millimoles, per 100 g of said compound, of an amino group and having a molecular weight of 500 to 10,000 and an iodine value of 50 to 500;
   (B) 3 to 100 parts by weight of a compound of the general formula:

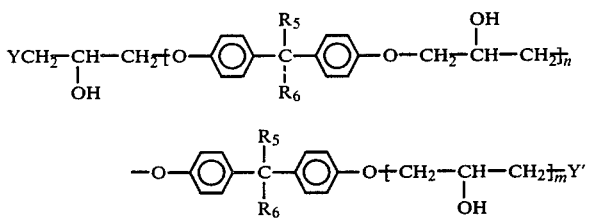

wherein $R_5$ and $R_6$ represent a hydrogen atom of an alkyl group having 1 to 10 carbon atoms, n is an integer of 0 to 20, m is 1 to 0, Y represents a residue of an α,β-unsaturated monocarboxylic acid having 3 or 4 carbon atoms, and Y' represents a hydrogen atom when m is 0 and Y when m is 1; or
   a compound of the general formula:

hydrogen atom or a hydrocarbon group having 1 to 10 carbon atoms, and Y is as defined; and
   (C) 0.2 to 20 parts by weight of a manganese salt of maleinized or sulfonated polymer of conjugated diolefin containing a carbon-carbon double bond and 30 to 300 millimoles, per 100 g of said polymer, of a sulfonic acid group or a succinic acid group and having a molecular weight of 300 to 3,000 and an iodine value of 50 to 500.

2. The composition of claim 1 wherein said high-molecular-weight compound (A) is a compound obtained by reacting maleinized polybutadiene with a diamine of the following formula

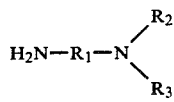

wherein $R_1$ represents a hydrocarbon group having 1 to 20 carbon atoms, and $R_2$ and $R_3$ represent a hydrogen atom or a hydrocarbon group having 1 to 20 carbon atoms which may partly be substituted by a hydroxyl group, to introduce an amino group.

3. The composition of claim 1 wherein the high-molecular-weight compound (A) is a compound obtained by addition reaction of epoxidized polybutadiene with a primary or secondary amine.

4. The composition of claim 1 wherein the compound (B) is a compound resulting from the addition of an acrylic or methacrylic acid to the terminals of an epoxy resin obtained by etherifying bisphenol with epichlorohydrin.

5. The composition of claim 1 wherein the compound (C) is a manganese salt of maleinized or sulfonated polybutadiene.

* * * * *